United States Patent
Safranek et al.

(10) Patent No.: US 7,783,959 B2
(45) Date of Patent: Aug. 24, 2010

(54) APPARATUS AND METHOD FOR REDUCED POWER CONSUMPTION COMMUNICATIONS OVER A PHYSICAL INTERCONNECT

(75) Inventors: Robert J Safranek, Portland, OR (US); Aaron T Spink, San Francisco, CA (US); Selim Bilgin, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1158 days.

(21) Appl. No.: 11/387,407

(22) Filed: Mar. 23, 2006

(65) Prior Publication Data

US 2007/0226596 A1 Sep. 27, 2007

(51) Int. Cl.
*H03M 13/00* (2006.01)
(52) U.S. Cl. .................. 714/781; 713/320; 713/310; 370/351
(58) Field of Classification Search ................. 714/781; 710/100; 713/320; 370/351
See application file for complete search history.

(56) References Cited

U.S. PATENT DOCUMENTS

| | | | |
|---|---|---|---|
| 6,973,072 B1 * | 12/2005 | Muntz | 370/351 |
| 7,093,146 B2 * | 8/2006 | Riley | 713/310 |
| 2005/0097378 A1 * | 5/2005 | Hwang | 713/320 |
| 2005/0238055 A1 | 10/2005 | Frodsham et al. | |
| 2005/0251599 A1 | 11/2005 | Hum et al. | |
| 2005/0251612 A1 | 11/2005 | Creta et al. | |
| 2005/0259696 A1 | 11/2005 | Steinman et al. | |
| 2005/0262368 A1 | 11/2005 | Cherukuri et al. | |

OTHER PUBLICATIONS

U.S. Appl. No. 11/211,063, filed Aug. 24, 2005.
U.S. Appl. No. 11/211,046, filed Aug. 24, 2005.

* cited by examiner

*Primary Examiner*—Sam Rizk
(74) *Attorney, Agent, or Firm*—Erik R. Nordstrom

(57) ABSTRACT

A system and method for reduced power consumption communications over a physical interconnect is described. In an embodiment, an input/output circuit includes a port to receive a transmission unit via an interconnect, a combining module coupled to the port to append at least one of a first and a second indicator to the transmission unit, a first adder module to generate the first indicator, indicating that the transmission unit is a starting transmission unit of a set of related transmission units, a second adder module to generate the second indicator, indicating that the starting transmission unit of the set of related transmission units has already been received, and logic to determine at least one of the start and end boundaries of the set of related transmission units.

19 Claims, 14 Drawing Sheets

Fig. 12a

| | L17 | L16 | L15 | L14 | L13 | L12 | L11 | L10 | L9 | L8 | L7 | L6 | L5 | L4 | L3 | L2 | L1 | L0 | C1 | C0 |
|---|---|---|---|---|---|---|---|---|---|---|---|---|---|---|---|---|---|---|---|---|
| 0 | PE [1:0] | | DNID [2:0] | | | RSVD | Message Class [3:0] | | | | Opcode [3:0] | | | | Virtual Network | | VC Crd [1:0] | | CRC 7 | CRC 3 |
| | PH [1:0] | | RHNID [2:0] | | | Address [11:6] | | | | | | Request Transaction ID [4:0] | | | | | Ack | VC Crd 2 | CRC 6 | CRC 2 |
| | IIB | Viral/ Psn | Addr [42:41] | Address [27:12] | | | | | | | | | | | | | | | CRC 5 | CRC 1 |
| | | | Address [5:3] | Address [40:28] | | | | | | | | | | | | | | | CRC 4 | CRC 0 |
| L | | | | RSVD | | | | | | | | | | | | | | | CRC 7 | CRC 3 |
| | | | | RSVD | | | | | | | | | | | | | | | CRC 6 | CRC 2 |
| | IIB | Viral/ Psn | Transfer Size [1:0] | | | | | | | Byte Enable [7:0] | | | | | | | | | CRC 5 | CRC 1 |
| | | | RSVD | RSVD | | | | | | | | | | | | | | | CRC 4 | CRC 0 |

Fig. 12b

| | L15 | L14 | L13 | L12 | L11 | L10 | L9 | L8 | L7 | L6 | L5 | L4 | L3 | L2 | L1 | L0 | C1 | C0 |
|---|---|---|---|---|---|---|---|---|---|---|---|---|---|---|---|---|---|---|
| 0 | PE [1:0] | | DNID [0] | RSVD | Message Class [3:0] | | | | Opcode [3:0] | | | | RSV D | Virt Net | VC Crd [1:0] | | CRC 7 | CRC 3 |
| | PH [1:0] | | RHN D [0] | Address [11:6] | | | | | | Request Transaction ID [4:0] | | | | | Ack | VC Crd 2 | CRC 6 | CRC 2 |
| | | | Address [5:3] | Address [27:12] | | | | | | | | | | | | | CRC 5 | CRC 1 |
| | | | | Address [40:28] | | | | | | | | | | | | | CRC 4 | CRC 0 |
| L | | | | RSVD | | | | | | | | | | | | | CRC 7 | CRC 3 |
| | | | | RSVD | | | | | | | | | | | | | CRC 6 | CRC 2 |
| | | | Transfer Size [1:0] | | | | | Byte Enable [7:0] | | | | | | | | | CRC 5 | CRC 1 |
| | | | | RSVD | | | | | | | | | | | | | CRC 4 | CRC 0 |

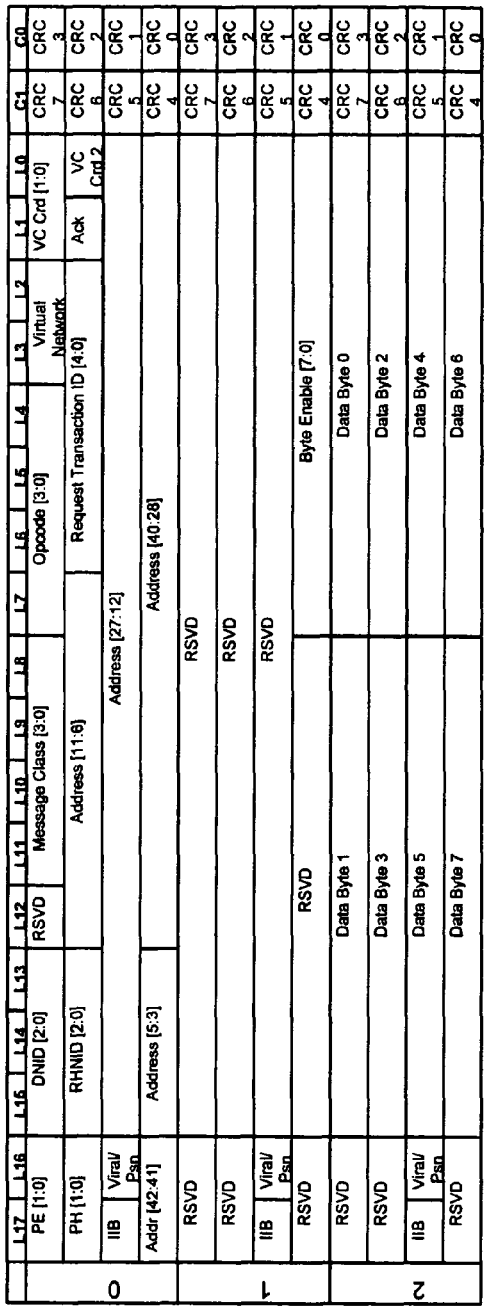
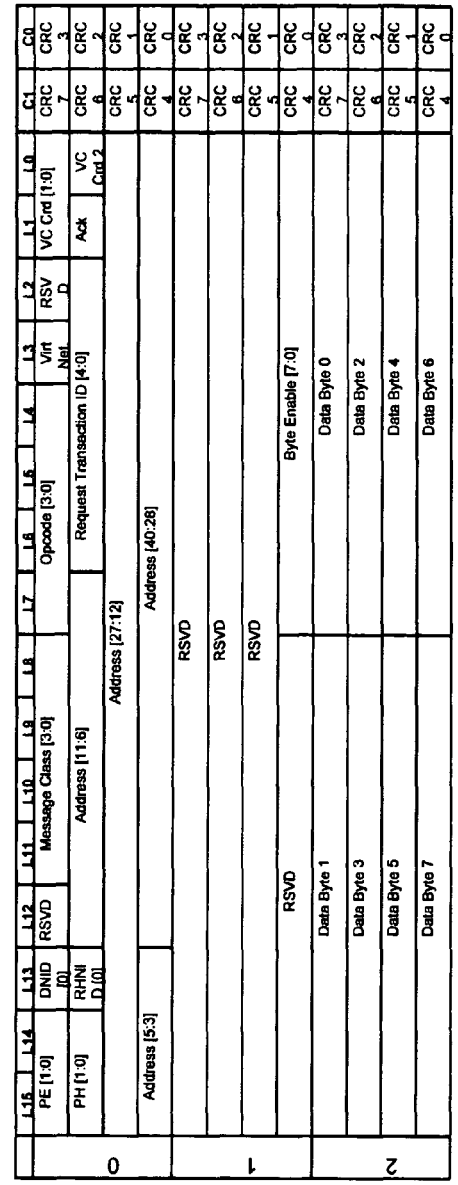
Fig. 13a
Fig. 13b

APPARATUS AND METHOD FOR REDUCED POWER CONSUMPTION COMMUNICATIONS OVER A PHYSICAL INTERCONNECT

FIELD

Aspects of embodiments of the invention generally relate to communication between computer systems components. More particularly, one or more embodiments relate to reducing power consumption associated with communication between system components.

BACKGROUND

Computer systems, such as mobile devices, utilize components that are coupled together with one or more internal buses which are used to transmit information between the various system components. Typical system components may include processors, memory and/or a chipsets. A mobile computing system may also include other components such as a graphics controller, memory hub, Input/Output (I/O) hub and peripheral devices.

Present bus standards may provide a multi-drop bus in which multiple devices are coupled to the bus. In order to achieve higher bus interface speeds, point-to-point architectures and are beginning to be developed. Because some mobile computer systems may operate on limited energy resources compared to fixed computer systems, power management is an important factor in the design of mobile devices. As such, computer systems are concerned with the energy consumption related to communication between system components.

BRIEF DESCRIPTION OF THE DRAWINGS

Embodiments of the invention are illustrated by way of example, and not by way of limitation, and proceed as follows:

FIGS. 11a, 12a and 13a illustrate embodiments of a various logical formats of a full width flit for transmission over 20 active lanes;

FIGS. 11b, 12b and 13b illustrate an embodiment of a various logical formats of a full width flit for transmission over 18 active lanes.

DETAILED DESCRIPTION

Described herein are selected embodiments of a system, method, and apparatus for reduced power consumption communications over a physical interconnect. In the following description, for purposes of explanation, numerous specific details are set forth in order to provide a thorough understanding of the present invention. It will be apparent, however to one skilled in the art that the present invention can be practiced without these specific details.

In general, power consumption associated with communication between system components over a physical interconnect may be reduced by removing power from certain portions of the physical interconnect. However, removing power from such interconnects may prevent the transmission and receipt of important information (e.g. communication protocol information).

In an embodiment, reduced power consumption may be realized by determining with a receiving system component, the information not communicated due to removal of power from portions of the interconnect.

In another embodiment, reduced power consumption may be realized by removing power from certain portions of an interconnect and determining with a boundary determination module located on the receiving system component, whether a transmission unit received by the system component is the starting transmission unit of a related set of transmission units.

The boundary determination module may include logic to cause certain data to be appended to an arriving transmission unit by adder and combining modules. The boundary determination module may also decode the transmission unit, and track the number of transmission units arriving. Through this tracking, the boundary determination logic may account for the information that was not communicated due to removal of power from portions of the interconnect (e.g. a reduction in width of the interconnect between Common System Interconnect (CSI) agents).

In another embodiment, the boundary determination logic may compare the outputs of transaction error checking modules to determine whether data appended to a transmission unit by adder and combining modules is the information that was not communicated due to removal of power from selected portions of the interconnect.

Adder and combining modules, as well as boundary determination, decoder, counting and transmission checking error modules may be instructions residing in memory and contain processing logic for execution. In another embodiment one or more modules may contain processing logic that comprises hardware such as circuitry, dedicated logic, programmable, logic, microcode, etc. In yet another embodiment, one or more of the modules may contain processing logic that comprises a combination of software and hardware.

Figure 1:
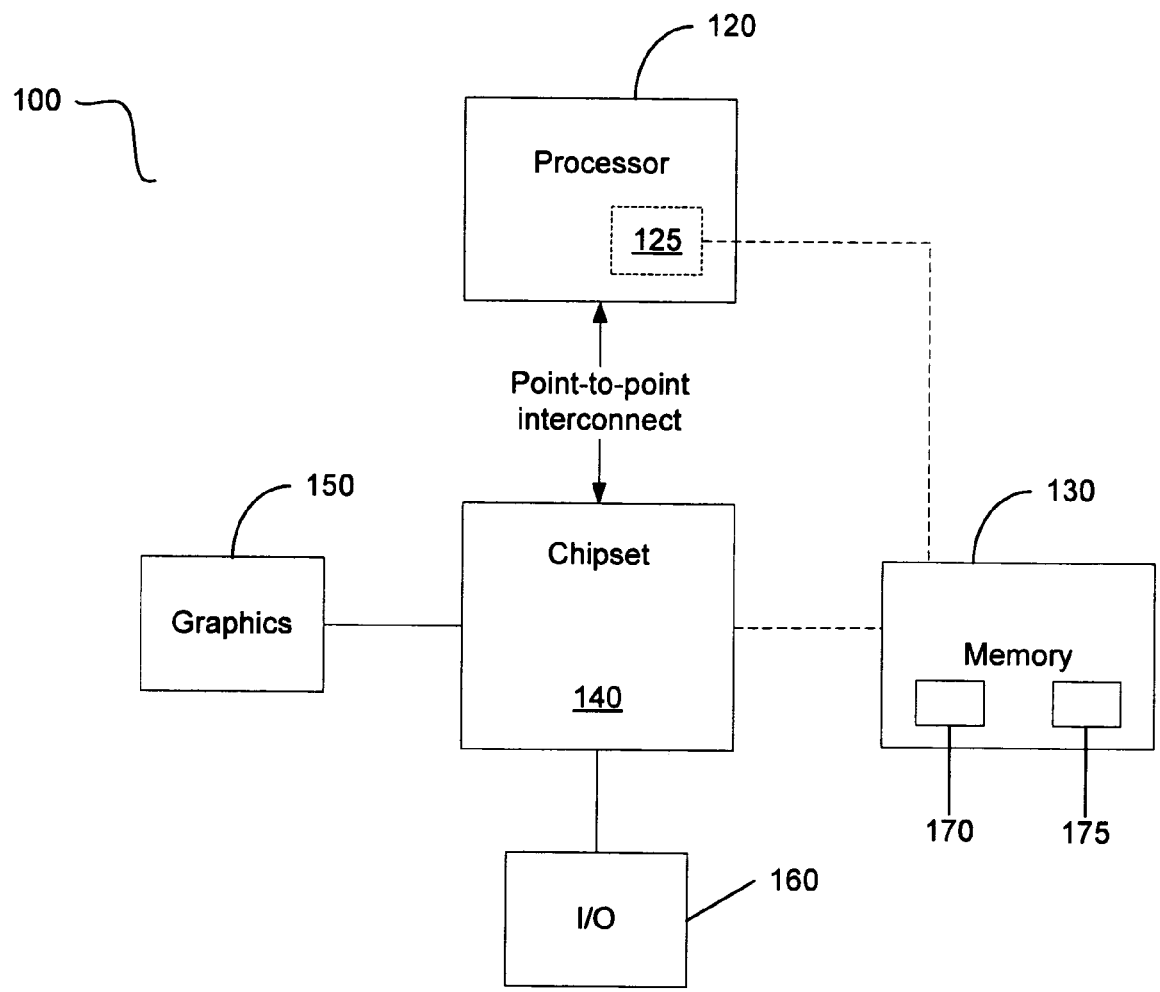
FIG. 1 illustrates a block diagram of an embodiment of a processing system.

FIG. 1 is a block diagram illustrating a processing system 100 that utilizes a physical interconnect interface (e.g. a point-to-point interconnect). The system 100 includes a processor 120. The processor 120 may include one or more processing cores. The processor 120 may also include one or more caches. The system 100 may include a memory system 130. Memory system 130 may store instructions 170 to be executed by the processor 120. Memory system 130 is intended as a generalized representation of memory and may include a variety of forms of memory, such as a hard drive, Compact Disc Read Only Memory (CD-ROM), random access memory (RAM), dynamic random access memory (DRAM), static random access memory (SRAM), flash memory and related circuitry. Memory system 130 may store instructions 170 and/or data 175 represented by data signals that may be executed by the processor 120.

In addition, the processor 100 may optionally include an integrated memory controller 125. For such embodiments, the integrated memory controller 125 provides an interface to the memory system 130. Also for such embodiments, a chipset 140 primarily supports graphics-related functionality in conjunction with a graphics component 150. The chipset 140 may also provide connectivity with input/output (I/O) devices 160. For an embodiment, chipset 140 may include one or more chipset devices, with each chipset device providing separate interface functionality. For example, one of the chipset devices may support graphics functionality while another chipset device may support I/O connectivity and/or interface with a firmware hub (not shown).

Alternatively, for an embodiment, the processor 120 does not include an integrated memory controller 125. For such embodiment, the chipset 140 provides memory control functionality as well as the graphics, I/O and/or firmware functionality described above. For such embodiment, the chipset 140 provides an interface to the memory system 130.

For an embodiment, the interface between each component of the processing system 100 is a point-to-point interface. For other embodiments, the interface may be a multi-drop bus interface. However, one of skill in the art will recognize that a single system 100 may include one or more multi-drop interfaces along with one or more point-to-point interfaces.

Figure 2:
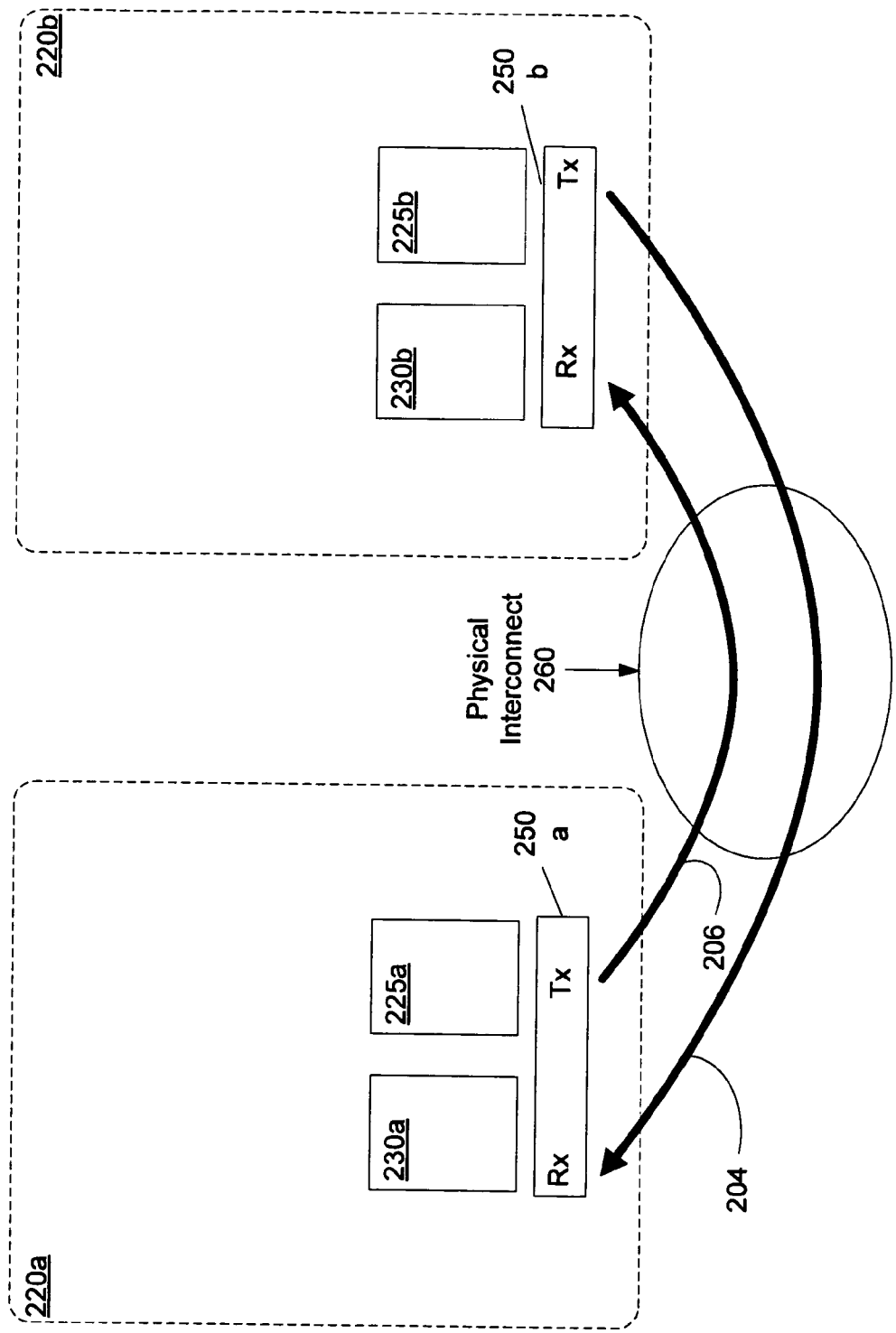
FIG. 2 illustrates a block diagram of an embodiment of system components coupled by a physical interconnect.

FIG. 2 is a block diagram illustrating a physical interconnect connecting the ports of two system components. For an embodiment, one of the devices 220a may be a processor (such as processor 120 shown in FIG. 1) and the other component 220b may be an I/O hub or chipset (such as chipset 140 shown in FIG. 1).

Referring to FIG. 2, various bus architectures may be used to connect devices 220a and 220b. In an embodiment, bus may include for example, a logical hardwired bus, an interconnect, a wireless communication channel, or similar connection pathway. In an embodiment, a point-to-point interconnect is employed where the physical interconnect 260 between the ports 250a and 250b includes two uni-directional links 204, 206. The unidirectional links include a transmit (Tx)-receive (Rx) link 206 going in one direction between the ports 250a, 250b and a Rx-Tx link 204 going in the other direction between the ports 250a, 250b.

Although FIG. 2 illustrates only one port 250 for each device 220, one of skill in the art will recognize that each device 220 may include additional ports (not shown). Each device, 220a and 220b, may also include transmit modules 225a and 225b and receive modules 230a and 230b coupled to ports 250a and 250b to support communication between devices 220a and 220b.

In an embodiment, portions of the physical interconnect 260 are powered off in order to preserve power. As a result of powering off a portion of physical interconnect 260, a transmission between devices 220a and 220b may not include data (i.e. information) that would have normally been sent had the portions of physical interconnect 260 been powered on. In an embodiment, this information may be important to executing a communication protocol (e.g. the information may have served as an indicator, describing attributes of arriving data).

Figure 3:
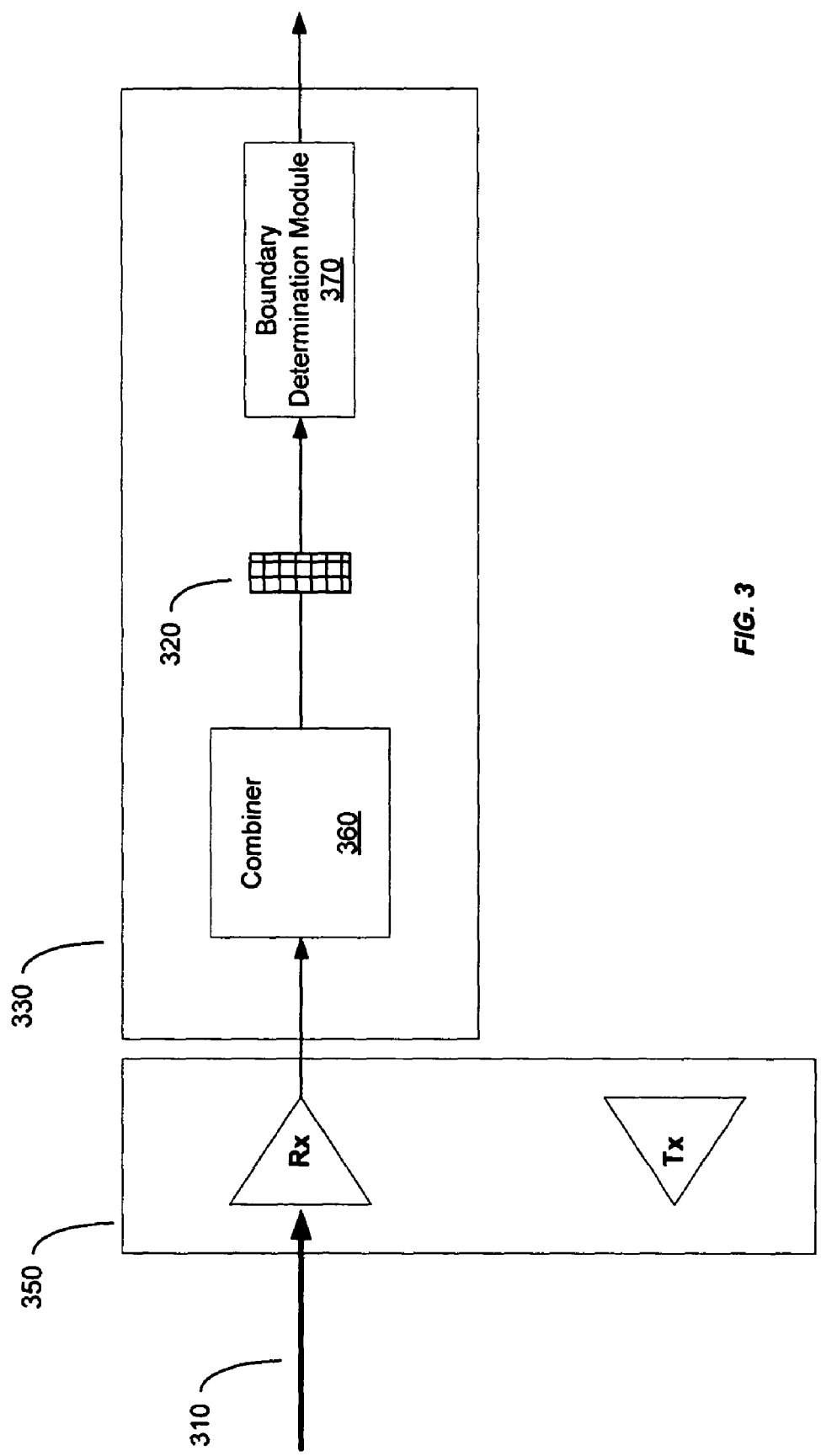
FIG. 3 illustrates a block diagram of an embodiment of the port of a system component coupled to a receive module.

FIG. 3 is a block diagram of a component port 350 (e.g. a transceiver) coupled to receive module 330 (e.g. receive module 230a or 230b of FIG. 2.). Receive module 330 includes combiner 360 and boundary determination module 370.

In an embodiment, data arrives at receiver module 330 via interconnect 310 (e.g. a bus internal to a computer system) and port 350. A set of data received by receiver module 330 may comprise a transmission unit. A transmission unit may be described as a transmission of related data communicated between the functional counterparts of transmitting and receiving devices over the interconnect in a single cycle. For example, in an 20 lane physical interconnect, 20 bits worth of information may be transmitted in a transmission unit in each cycle.

In an embodiment, a portion of interconnect 310 connecting a remote system component (not shown) to a local system component may have been disabled in order to conserve power. As a result, the data in a portion of a transmission unit corresponding to the disabled portion of interconnect 310 may have been prevented from being delivered to the receive module 330. In one embodiment, this missing data would have indicated whether a transmission unit was a start of a larger transmission unit or not the start of a larger transmission unit (e.g. a packet header or a packet data). This means that the disabled portion of the interconnect does not need to consume power to convey information between components internal to the device.

In an embodiment, combiner 360 may receive an initial transmission unit. In another embodiment, combiner 360 may form an initial transmission unit from the data received at component port 450. Once combiner 360 contains an initial transmission unit, combiner 360 may append the transmission unit with data in order to form an appended transmission unit 320. The appended data may provide an indication of the information that was not received by the receive module 330 due to disablement of portions of the interconnect 310. In an embodiment, the appended data may indicate that the appended transmission unit is the start of a set of related transmission units or conversely that the appended transmission unit is not said start. Combine module 360 may then forward the appended transmission unit 320 to the boundary determination logic 370. Based the on data appended by combiner 360, determination logic 370 may then determine the information missing from the initial transmission unit. In an embodiment, determination logic 370 may determine that the appended transmission unit is the start or not the start of a larger transmission unit.

Thus, an input/output circuit may receive a transmission unit at its port 350 from another component within an apparatus (not shown) via an internal bus 310. A combiner 360 may be coupled to the port to append an indicator to a transmission unit. Finally, a boundary determination module 370 may determine, based at least in part on the indication appended to the transmission unit, that the transmission unit is at least one of a starting transmission unit of a set of related transmission units and not the starting transmission unit of the set of related transmission units.

Through the practice of embodiments described, the overall power consumption involved in transmitting and receiving data between components over an internal bus may be reduced.

Figure 4:
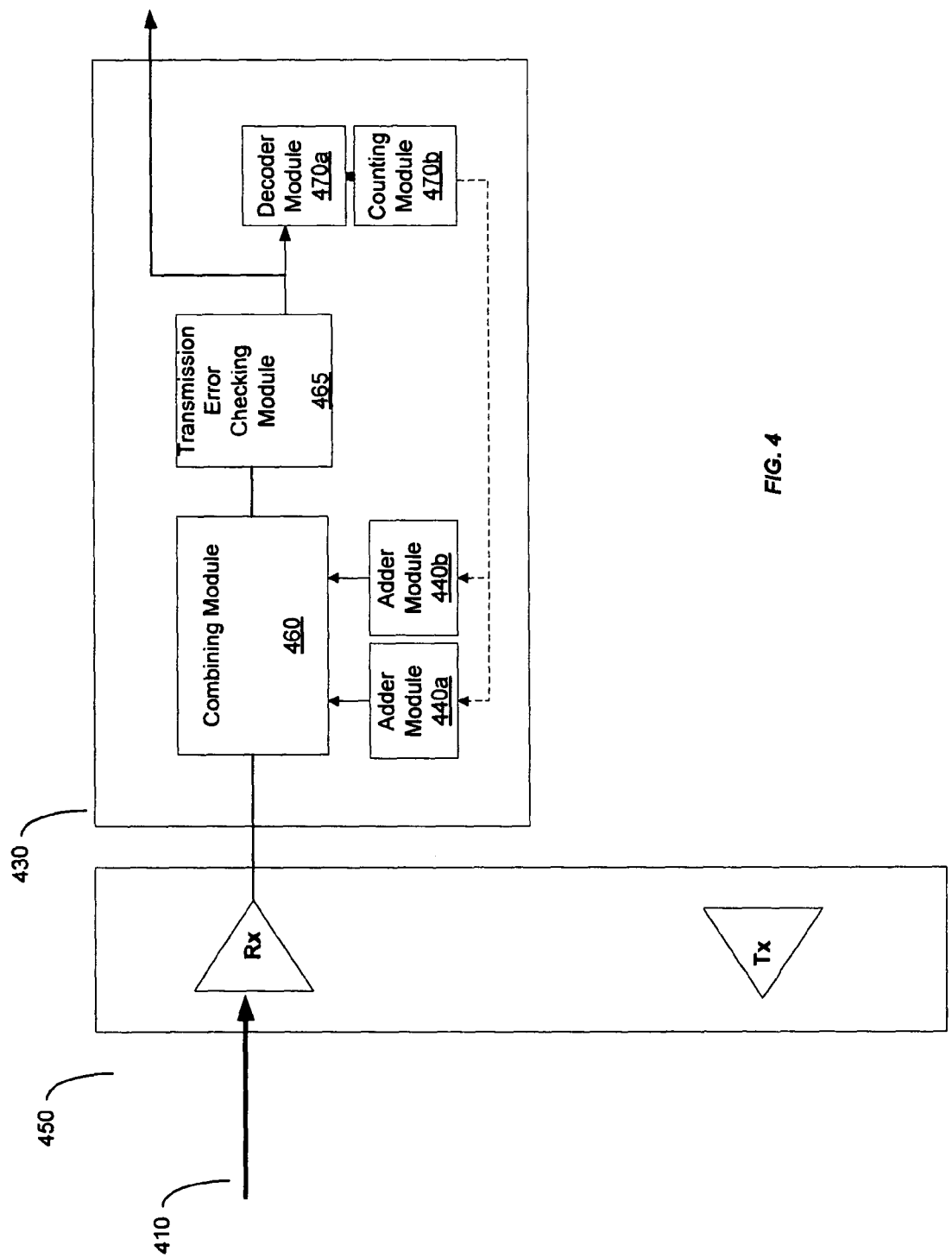
FIG. 4 illustrates a block diagram of an embodiment of the port of a system component coupled to a receive module.

FIG. 4 is a block diagram of a component port 450 (e.g. a transceiver) coupled to a receive module 430 (e.g. receive module 230a or 230b of FIG. 2.).

As will be described below, a system component receives at its port 450, a transmission unit via an internal bus 410. A combining module 460 is coupled to the port to append at least one of a first and a second indicator to the transmission unit. A first adder module 440*a* generates the first indicator, indicating that the transmission unit is a starting transmission unit of a set of related transmission units. A second adder module 440*b* generates the second indicator, indicating that the starting transmission unit of the set of related transmission units has already been received. At least one transmission error checking module 465 may perform an error checks on appended transmission units based on a size of the transmission unit, the size including at least one of the first and second indicators. A decoder module 470*a* is configured to assume that an initial transmission unit received is the starting transmission unit of the set of related transmission units. The decoding module 470*a* may also decode the starting transmission unit to determine the number of transmission units belonging to the set of related transmission units. Based on this number, counting module 470*b* may track the start and end boundaries of the set of related transmission units.

Referring to FIG. 4, receive module 430 includes combining module 460 to combine data received by receive module 430 with other data generated by adder modules 440*a*, 440*b*. Receive module 430 also includes a transmission error checking module 465 (e.g. cyclic redundancy checker (CRC)) to check transmission units for errors incurred during transmission over the bus 410. Transmission error checking module 465 may compare characteristics possessed by a transmission unit when it is on the transmitter side with characteristics possessed by a transmission unit when it is on the receiver side. If the compared characteristics (e.g. a CRC) are different, a transmission error may have occurred between system components. Receive module 430 further includes decoder and counting modules 470*a* and 470*b*. Decoding module 470*a* decodes transmission units for information while counting module 470*b* tracks certain transmission units received by receive module 430.

In order to enable the function of the transmission error checking module 465, a transmission unit may carry with it, characteristics possessed by a transmission unit when it was on the transmitter side (e.g. a CRC). Such characteristics may be based in part on data that were prevented from being received due to the powering down of the portion of the physical interconnect (e.g. a CRC may be based on un-transmitted data and transmitted data).

In different embodiments, combining module 460 may either receive or form an initial transmission unit based on data received via internal bus 410 and port 450. In an embodiment, the leading (or first) transmission unit (i.e. the leading, initial transmission unit) either received or formed by combining module 430 is assumed by counting module 470*b* to be the starting transmission unit of a set of related transmission units. Thus, counting module 470*b* signals adder module 440*a* to generate data indicating that the leading, initial transmission unit is the starting transmission unit of a set of related transmission units. The combining module 460 then appends the initial transmission unit with the data from adder module 440*a* to create an appended transmission unit, and forwards the appended transmission unit (i.e. the appended, leading transmission unit) to the transmission error checking module 465. If transmission error checking module 465 detects a transmission error, receiver module 430 requests a retry from the transmission side via internal bus 410. If an error is not detected, the appended transmission unit is forwarded to decoder 470*a*.

In an embodiment, decoder module 470*a* decodes the appended leading transmission unit to determine the number of transmission units belonging to a set of related transmission units. This number is forwarded to counting module 470*b*. With the number of transmission units remaining in the set of related transmission units known, counting module 470*b* is then enabled to track the boundaries of the set of related transmission units. As subsequent initial transmission units arrive, counting module 470*b* signals adder module 440*b* to generate data indicating that each remaining initial transmission units is not the starting transmission unit of the set of related transmission units. Appended transmission units are sent from combining module 460 to transmission error checking module 465 for further processing. If a transmission error is not detected, those remaining of the set of related transmission units bypass the decoder and are sent to additional modules to be assembled into a larger transmission unit.

Through the practice of embodiments described above, the overall power consumption involved in transmitting and receiving data between devices over an internal bus may be reduced.

Figure 5:
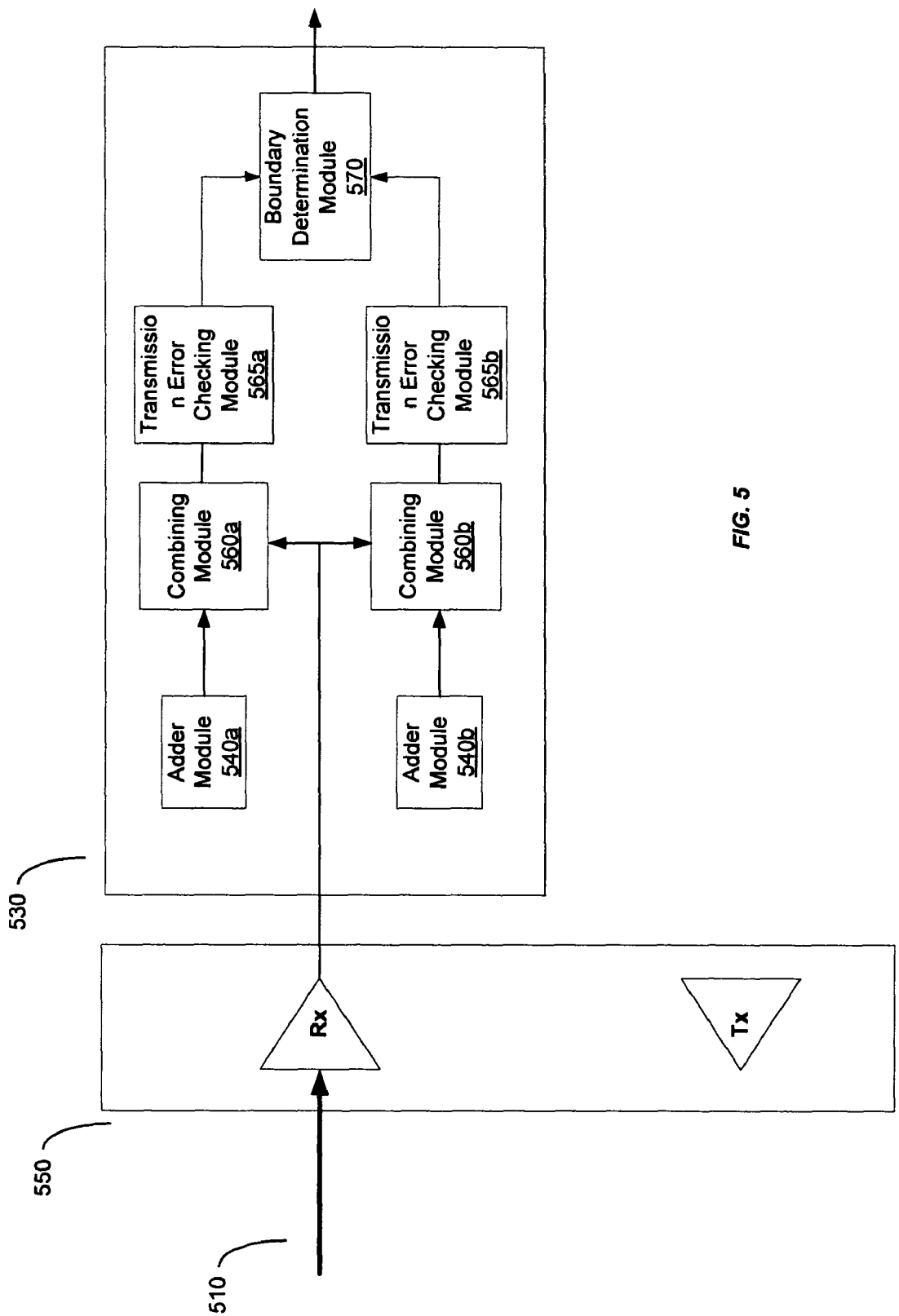
FIG. 5 illustrates a block diagram of an embodiment of the port of a system component coupled to a receive module.

FIG. 5 is a block diagram of a device port 550 (e.g a transceiver) coupled to a receive module 530 such as receive module 230*a* or 230*b* of FIG. 2. As described in embodiments above, receiver module 530 includes adder modules 540*a*, 540*b*, boundary determination module 570, and transmission error checking modules 565*a*, 565*b*.

In an embodiment, combining modules 560*a* and 560*b* may either receive or form identical instances of a transmission unit. A portion of the transmission unit corresponding to a disabled portion of interconnect 510 may have been prevented from being delivered to the receive module 530. Thus, the transmission unit may be classified as an initial transmission unit as opposed to an appended transmission unit.

In an embodiment, adder module 540*a* and 540*b* may generate different sets of data representing different information. In an embodiment, combining module 560*a* appends an instance of the initial transmission unit with the set of data generated by adder module 540*a*. Similarly, combining module 560*b* appends the other instance of the initial transmission unit with the set of data generated by adder module 540*b*. The sets of data generated by adder modules 540*a*, 540*b* are mutually exclusive with respect to the initial transmission unit. In other words, both of sets of data cannot represent the information that was not received by receiver 530 due to disablement of a portion of interconnect 510. The appended transmission units are forwarded to transmission error checking modules 565*a*, 565*b*.

If boundary determination logic 570 determines that transmission error checking module 565*a* did not generate an error and transmission checking module 565*b* did generate an error, then the set of data generated by adder module 540*a* corresponds to the data that were prevented from being received due to disablement of a portion of the interconnect 510. Conversely, if boundary determination logic 570 determines that transmission error checking module 565*b* did not generate an error and transmission checking module 565*ba* did generate an error, then the set of data generated by adder module 540*b* corresponds to the data that were prevented from being received due to disablement of a portion of the interconnect 510. If boundary determination logic 570 determines that both transmission checking modules, 565*a*, 565*b* generated an error or both did not generate an error then receiver module 430 requests a retry from the transmission side via internal bus 410. Here, neither set of data from adder modules 540*a*, 540*b* are determined to correspond to the data that were prevented from being received due to disablement of a portion of the interconnect 510.

Figure 6:
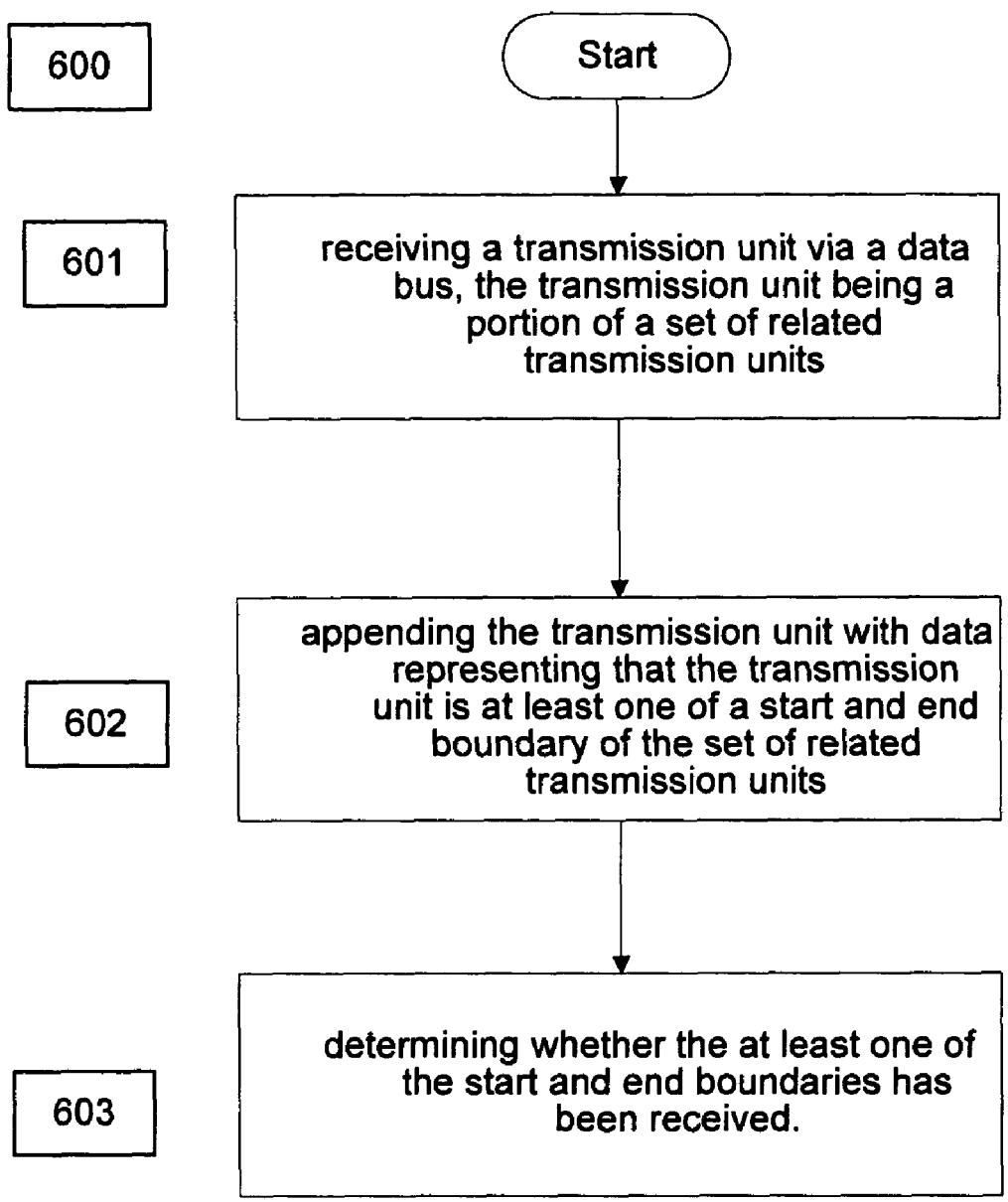
FIG. 6 is a flow diagram of an embodiment of a process for reducing power consumption by a physical interconnect.

FIG. 6 is a flow diagram of one embodiment of a process 600 for conserving energy during communication over an internal bus. The process may be performed by processing logic that may comprise hardware (e.g., circuitry, dedicated logic, programmable logic, microcode, etc.), software (such as that run on a general purpose computer system or a dedicated machine), or a combination of both. In one embodiment, process 600 is performed by receiver module 330 of FIG. 3. In FIG. 6, process 600 starts with processing logic receiving a transmission unit via a data bus, the transmission unit being a portion of a set of related transmission units (processing block 601). Processing logic may then proceed by appending the transmission unit with data representing that the transmission unit is at least one of a start and end boundary of the set of related transmission units (processing block 602). Processing logic may conclude the process by determining whether the at least one of the start and end boundaries has been received (processing block 603).

Following the determination process described in FIG. 6, energy normally expended on portions of an interconnect to transfer information may be conserved.

Figure 7:
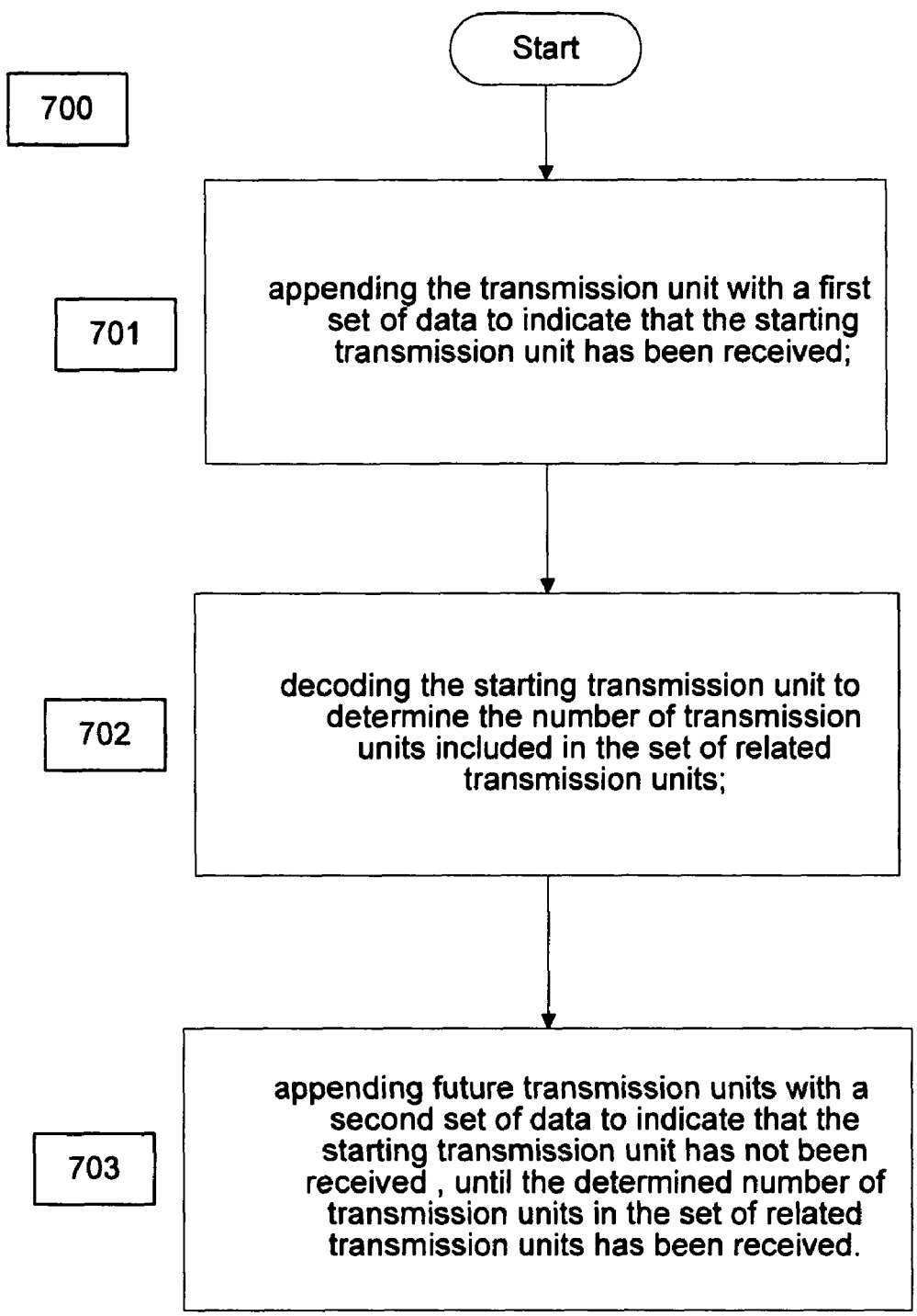
FIG. 7 is a flow diagram of an embodiment of a process for determining whether a start or end boundary of a set of transmission units has been received.

FIG. 7 is a flow diagram of one embodiment of a process 700 for determining whether a start or end boundary of a set of related transmission units has been received. In one embodiment, process 700 is performed by receiver module 430 of FIG. 4. In FIG. 7, process 700 starts with processing logic appending a transmission unit with a first set of data to indicate that a starting transmission unit has been received; (processing block 700). Processing logic may then proceed by decoding the starting transmission unit to determine the number of transmission units included in the set of related transmission units (processing block 702). Processing logic may conclude the process by appending future transmission units with a second set of data to indicate that the starting transmission unit has not been received, until the determined number of transmission units in the set of related transmission units has been received (processing block 703).

Figure 8:
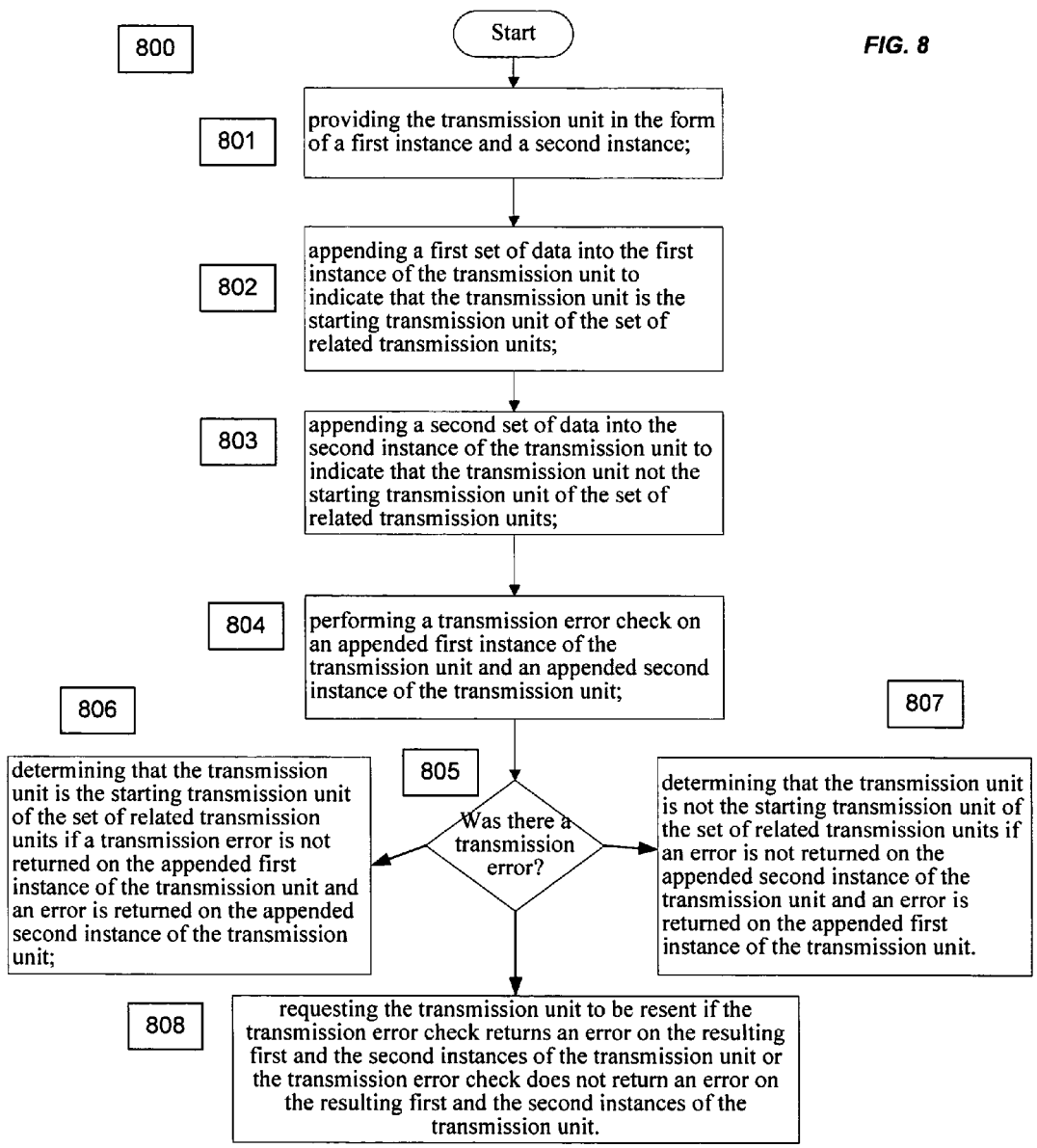
FIG. 8 is a flow diagram of an embodiment of a process for determining whether a start or end boundary of a set of transmission units has been received.

FIG. 8 is a flow diagram of another embodiment of a process 800 for determining whether a start or end boundaries of a set of related transmission units has been received. In one embodiment, process 800 is performed by receiver module 530 of FIG. 5. In FIG. 8, process 800 starts with providing a transmission unit in the form of a first instance and a second instance (processing block 801). Processing logic may then proceed by appending a first set of data into the first instance of the transmission unit to indicate that the transmission unit is the starting transmission unit of the set of related transmission units (processing block 802) and appending a second set of data into the second instance of the transmission unit to indicate that the transmission unit not the starting transmission unit of the set of related transmission units (processing block 803). Processing logic may continue the process by performing a transmission error check on each of an appended first instance of the transmission unit and an appended second instance of the transmission unit (processing block 803).

Depending on the results of the transmission error check, processing logic 805 may conclude the process by causing one of the following process blocks to occur: 1. determining that the transmission unit is the starting transmission unit of the set of related transmission units if a transmission error is not returned on the appended first instance of the transmission unit and an error is returned on the appended second instance of the transmission unit (processing block 806), or 2. determining that the transmission unit is not the starting transmission unit of the set of related transmission units if an error is not returned on the appended second instance of the transmission unit and an error is returned on the appended first instance of the transmission unit (processing block 807) or 3. requesting the transmission unit to be resent if the transmission error check returns an error on the resulting first and the second instances of the transmission unit or the transmission error check does not return an error on the resulting first and the second instances of the transmission unit (processing block 808).

Referring again to FIG. 1, the block diagram illustrates that an embodiment of the processor 120 includes an external point-to-point interface 160 with the chipset 140. The interface 160 may be a link interface based on CSI, a cache-coherent, point-to-point interface specification.

Accordingly, the processor 120 and the chipset 140 may each be CSI agents in that they each host one or more ports that are compliant with the CSI interface specification.

Each CSI agent has one or more ports. The physical interconnect between a port of one CSI agent and a port of another CSI agent includes two uni-directional links, one in each direction. Each CSI agent may thus have as many physical interconnects as it has ports.

Figure 9A:
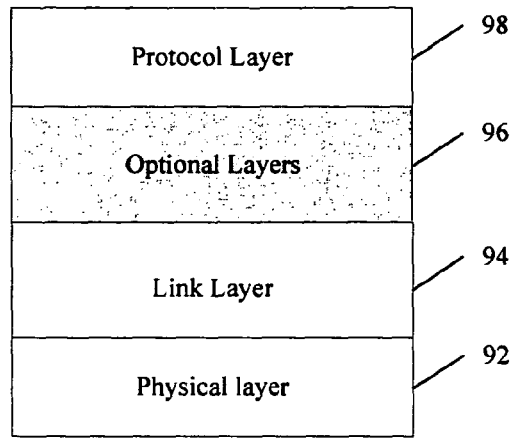
FIG. 9a is a block diagram of an embodiment of a layers of the CSI interface.

FIG. 9a is a block diagram illustrating layers of the CSI interface. The functionality of CSI is partitioned into five layers, one or more of which may be optional for certain platform options. The layers illustrated in FIG. 2 include, from bottom to top, a physical layer 92 and a link layer 94. The CSI layers also include optional layers 96. Optional layers 96 include a transport layer and a routing layer. Finally, the layers include a protocol layer 98.

The physical layer 92 is responsible for electrical transfer of information between two CSI agents across the physical medium. For an embodiment, the physical link is a point-to-point link between the two CSI agents and uses a differential signaling scheme. The link layer 94 abstracts the physical layer from the upper layers. For an embodiment, the link layer 94 provides for reliable data transfer and flow control between two directly connected CSI agents. The transport and routing layers (see 96) are optional and are utilized for certain platform options only. For example the functionality of the routing layer may be embedded in the link layer for certain desktop, mobile and dual processor systems. Generally, the routing layer provides a flexible and distributed manner of routing CSI packets from a source to a destination and the transport layer provides support for end-to-end reliable transmission between two CSI agents that each have transport layer capability. FIG. 9a illustrates that the top-most layer of the CSI point-to-point interface is the protocol layer 98. The protocol layer implements higher level communication between CSI nodes. The protocol layer may implement cache coherence, ordering, peer to peer I/O, and interrupt delivery.

Figure 9B:
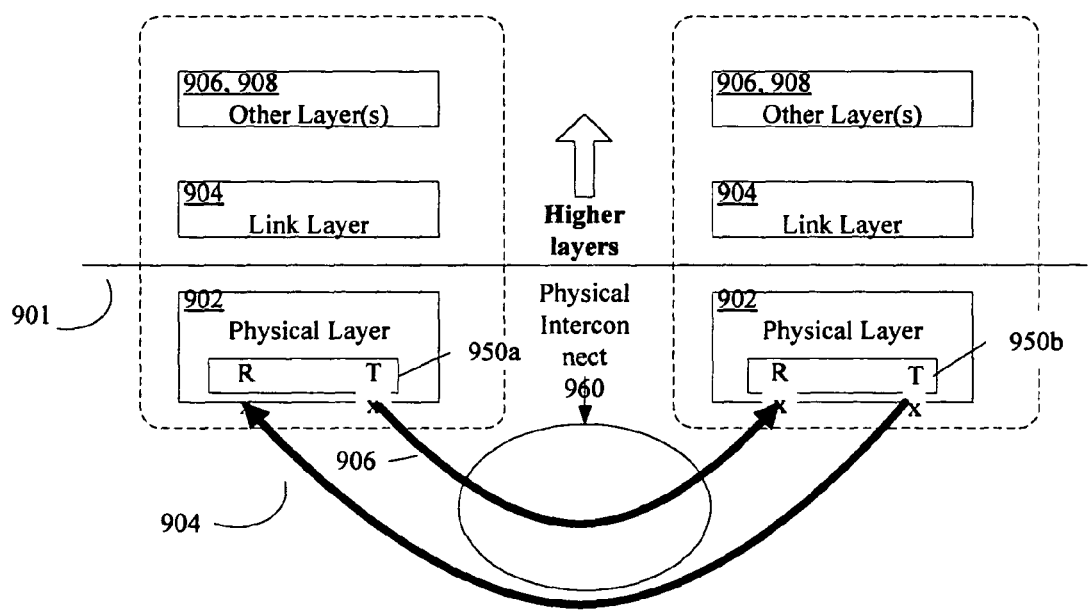
FIG. 9b illustrates a block diagram of an embodiment of CSI agents coupled by a point-to-point interconnect.

FIG. 9b is a block diagram illustrating an embodiment of a physical interconnect 960 between the ports 950a, 950b, respectively, of two CSI agents 920a, 920b. Although FIG. 9b illustrates only one port 950 for each agent 920, one of skill in the art will recognize that each agent 920 may include additional ports (not shown). FIG. 9b illustrates that the physical layer 902 is responsible for providing a means of communication between the CSI ports 350 of each of the agents 920a, 920b. For an embodiment, one of the agents 920a may be a processor (such as processor 120 shown in FIG. 1) and the other agent 920b may be an I/O hub or chipset (such as chipset 140 shown in FIG. 1). FIG. 9b illustrates that the physical interconnect 360 between two ports 350 includes two unidirectional links 904, 906. FIG. 9b illustrates that the unidirectional links include a transmit (Tx)—receive (Rx) link 906 going in one direction between the ports 950a, 950b and a Rx-Tx link 904 going in the other direction between the ports 950a, 950b.

As is stated above, each CSI agent 920 is host to one or more ports 950. As used herein, the term "port" may refer to one or more transceivers of an agent 920. For an embodiment, a transceiver is a transmit/receive (Tx, Rx) differential pair. For an embodiment, a differential pair is a pair of copper conductors that form a conduit for one bit of control/data or clock information; the pair of conductors may embody a differential signaling scheme. For an embodiment, each of Tx and Rx differential pairs is thus utilized to transmit or receive a clock signal or 1 bit of control or data. For an embodiment wherein each of the Tx and Rx differential pairs represents a single bit of data, a port 950 may include enough Tx, Rx pairs (transceivers) to support the total number of bits defined for the physical interconnect 960.

Thus, for an embodiment wherein each link is defined to be 20 bits wide, for example, a port 950 may include 20 differential Tx pairs to send control/data in one direction, along with a differential Tx pair to carry the forwarded clock, and may also include 20 differential Rx pairs to receive control/data in the other direction, along with a differential Rx pair to receive the forwarded clock. For an embodiment, a default link width is 20 bits wide. Such a link includes twenty Rx and Tx differential pairs to carry, in one direction, control/data and an additional differential pair to carry the forwarded clock in the same direction. The conduit from a local Tx or Rx differential pair of one agent, respectively, to a remote Rx or Tx differential pair, respectively, of another agent is referred to herein as a "lane." For an embodiment, a link having 20 physical data/control lanes is referred to as a full width link. The physical lanes of a link may be configured to be inactive in order to facilitate a lesser-width link. That is, for an embodiment having 20-bit full-width links, a link may be configured in a half-width mode with 10 active lanes or in a quarter-width mode having 5 active lanes. In some such embodiments, there may be no requirement that the number of active links in each direction of a physical interconnect be configured with the same number of active lanes at a given time. For instance, a physical interconnect having a 20-lane uni-directional link in each direction may have one of the links configured to have 20 active lanes configured in one direction and 10 active lanes configured for the other direction.

In an embodiment, data normally communicated over a full width link having 20 physical lanes may be communicated over less than 20 physical lanes (e.g. 18 physical lanes). Similarly, in an embodiment, data normally communicated over a half width link having 10 physical lanes may be communicated over less than 10 physical lanes (e.g. 9 physical lanes).

In an embodiment, the ports 950*a*, 950*b* are transparent to the link layer 904, and they only interface with logic (not shown) in the physical layer 902. The link layer 904 and the physical layer 902 communicate over interface 901. The interface 901 may include a transmit data path and control signals, as well as a receive data path in the opposite direction along with associated control signals. The control signals control data transfer between the link layer 904 and the physical layer 902.

The smallest unit of information transferred to/from the link layer 904 over the interface 901 is referred to as a "flit." In contrast, the smallest unit of data transferred from one agent to another at the physical layer 902 is referred to as a "phit." The transmit circuitry (Tx) for one agent sends phits over the link 904, 906 to the receive circuitry (Rx) of another agent. The link layer 904 relies on the physical layer 902 to frame one or more physical layer units of transfer (phits) into the link layer unit of transfer (flit) before such information is transferred over the interface 901. Over a full width, 20 lane link, four phits comprise a flit. For example, the physical layer of a CSI agent may form an 80 bit flit from four 20 bit phits received at port. Conversely, the physical layer may break an 80 bit flit into four 20 bit phits to be transferred over the link. For a half width link having 10 active lanes, the physical layer operates on eight phit flits.

Figure 10:
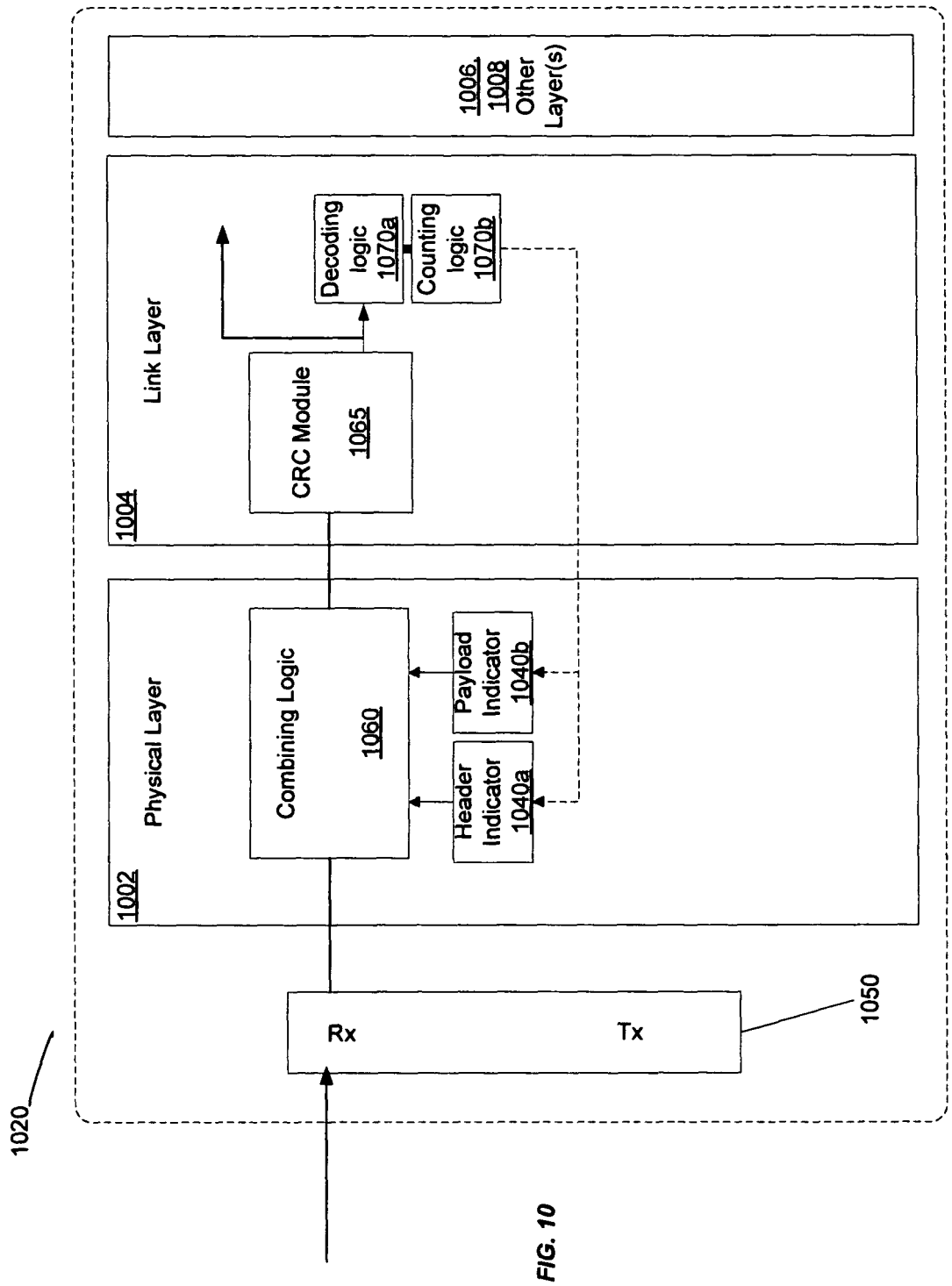
FIG. 10 illustrates a block diagram of an embodiment of a CSI agent coupled to a transceiver.

FIG. 10 is a block diagram of a CSI agent receiving phits at port 1050 from a remote transmitter (not shown), e.g. a CSI agent. Port 1050 is communicatively coupled to internal combining logic 1060 located within the physical layer 1030 of CSI agent 1020. In an embodiment, a full width link connects CSI agent 1020 to remote transmitter at port 1050. Power to two lanes of the physical interconnect has been removed. Alternatively, only 18 physical lanes exist. In either case, there are 18 lanes available for transmissions over the link. One advantage of communicating over 18 lanes instead of 20 lanes is conservation of energy. It is especially important to conserve energy on devices that run on battery power because batteries may provide a limited supply of energy compared to other power supplies. Power savings in this manner can also be realized on a half width, 10 lane link. In an embodiment, only 9 lanes are made available for transmission over the half width link.

In an embodiment, an effect of communicating over 18 lanes instead of 20 lanes is the inability to transfer information that would normally be transmitted over the two missing lanes. For example, information indicating whether a flit is a header flit or is a data flit may be communicated over 20 lanes but left off in communicates over 18 lanes. A similar problem arises when communicating over a half width link using 9 lanes instead of 10.

Figure 11A:
Figure 11B:

In an embodiment, the logical format of a flit has been reorganized to allow communication using the CSI protocol despite the unavailability of two lanes of a full width link. FIG. 11*a* illustrates the logical format for a flit that may be transmitted over a 20 bit wide link. The 80 bits sent by the remote transmitter include 72 bits of payload data and 8 bits of CRC data. FIG. 11*b* illustrates the logical format for a flit that may be transmitted over an 18 bit wide link. Here only 72 bits are sent by the remote transmitter which includes 64 bits of payload data and 8 bits of CRC data. It can be seen that the 20 lane logical format includes 8 more bits than the 18 lane logical format.

Under the 18 lane logical format, only 72 bits are transferred across the link, the CRC logic of the remote transmitter however, calculates a CRC on 80 bits, i.e. as if all 20 lanes were available for data transfer. To do this, a series of eight logical ones are appended to the 72 bits if the flit is the first header flit. Otherwise, a series of eight logical zeros are appended to the 72 bits. These appended bits are not transmitted to CSI agent 1020 because their logical lanes correspond to the two physical lanes that are not available for communication.

On the receiving side, CSI agent 1020 receives 72 bits in four phits at port 1050 on the physical layer. The phits are combined by combining logic 1060 into an 80 bit flit by appending the 72 bits with 8 bits from either the header indicator 1040*a* or the payload indicator 1040*b*. Header and payload indicators 1040*a*, 1040*b* indicate whether the 72 bit flit is a header flit or a payload flit. Counting logic 1070*b* assumes that the first received flit is the header flit of a packet. Thus, upon the first received flit, counting logic sends a control signal to header indicator 1040*a* causing header indicator 1040*a* to generate a series of eight logical ones to be combined with the 72 bit flit to indicate that it is a header flit. The 80 bit header flit is forwarded to CRC module 1065 to check for transmission errors. CRCs calculated on the transmitter side and the receiver side can be reconciled because the CRC calculations on both sides are based on 80 bits of data. If an error is not generated by CRC module 1065 on the 80 bit header, then the CRC values calculated on each side are equal. Thus, the 72 bits are in fact header flit data, and transmission errors did not occur on the link. If an error is generated by CRC module 1065 then the CRCs are unequal and CSI agent 1020 may request that the data be resent by remote transmitter. The first header flit is then decoded by decoding logic 1070*a* to determine the remaining number of flits belonging to a packet.

Counting logic 1070*b* uses this information to cause payload indicator 1040*b* to generate 8b00000000 to be appended by combining logic 1060 to subsequent 72 bit flits, until the number of remaining flits in the packet has been received. If an error is not generated by CRC module 1065 on an 80 bit payload flit, then the CRC values calculated on each side are equal. Thus, the 72 bits are in fact payload flit data, and transmission errors did not occur over the link. If an error is generated by CRC module 1065 then the CRCs are unequal and CSI agent 1020 may request that the data be resent by remote transmitter. Flits appended with 8b00000000 are not decoded by decoding logic 1070*a*, they are forwarded to additional logic within the link layer (not shown) to be formed into a packet. In this fashion, counting logic 1076*b* tracks packet boundaries and causes header and payload indicators 1040*b* to generate appropriate indicators for arriving flits.

In an embodiment, a packet may be comprised of more than one header flit. FIGS. 12*a* and 12*b* illustrate the difference in logical format between a 20 lane double header flit, and an 18 lane double header flit. Similarly, FIGS. 13*a* and 13*b* illustrate the difference in logical format between a 20 lane triple header flit and an 18 lane triple header flit. In an embodiment, even if a flit it a header flit, it will be appended with 8b00000000 if it is not determined by counting logic 1070*b* to be the first header flit of a packet.

Figure 14:
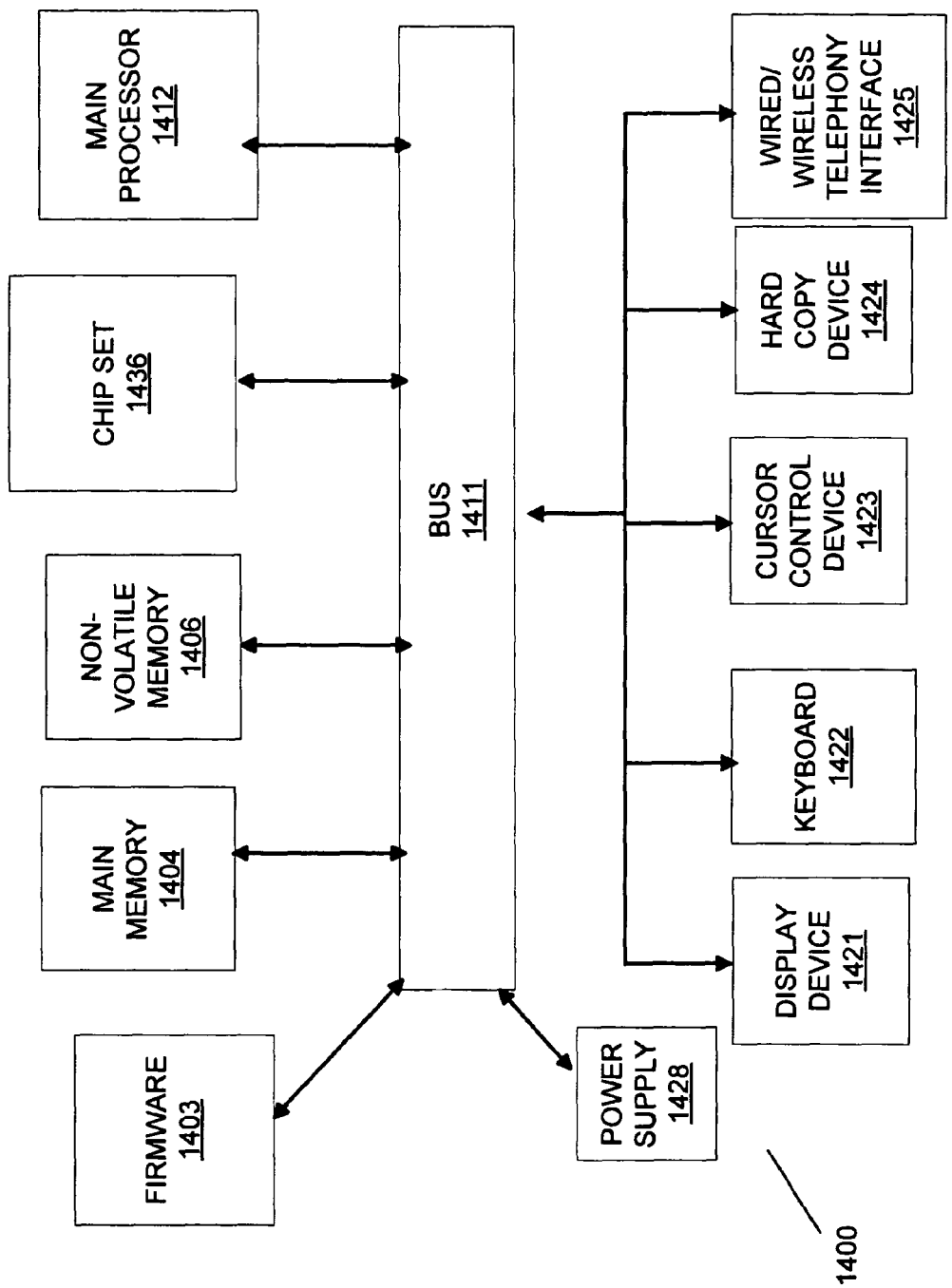
FIG. 14 is a block diagram of an embodiment of a computer system.

Embodiments of the methods disclosed herein may be performed in a processing system such as the systems 100, 1400 shown in FIGS. 1 and 14, respectively. Systems 100 and 1400 are representative of processing systems that include Itanium® and Itanium® 2 microprocessors and Pentium®, Pentium® Pro, Pentium® II, Pentium® III, Pentium® 4 microprocessors, Pentium® M microprocessors, as well as other similar processors, all of which may be available from Intel Corporation. Systems 100 and 1400 are also representative of processing systems, such as cellular telephones, personal digital assistants, portable video players, portable media players and other hand-held devices based on the Intel® XScale™ technology. Other systems (including personal computers (PCs) and servers having other microprocessors, engineering workstations, set-top boxes and the like) may also be used. An embodiment of system 100 and/or 800 may execute a version of the Windows™ operating system available from Microsoft Corporation, although other operating systems and graphical user interfaces, for example, may also be used.

The processing system 100 may be incorporated into any of several platforms, including desktop, mobile and server platforms. For any of these platforms, the processing system may further be based on any type of processor architecture, including 16-bit, 32-bit, 64-bit and 128-bit processor architectures.

Examples of mobile devices may be a laptop computer, a cell phone, a personal digital assistant, or other similar device with on board processing power and wireless communications ability that is powered by a Direct Current (DC) power source that supplies DC voltage to the mobile device and that is solely within the mobile device and needs to be recharged on a periodic basis, such as a fuel cell or a battery.

FIG. 14 illustrates a block diagram of an example computer system that may use an embodiment of reducing power consumption involved with communication over a physical interconnect. In one embodiment, computer system 1400 comprises a communication mechanism or bus 1411 for communicating information, and an integrated circuit component such as a main processing unit 1412 coupled with bus 1411 for processing information. One or more of the components or devices in the computer system 1400 such as the main processing unit 1412 or a chip set 1436 may use an embodiment of reducing power consumption involved with communication over a physical interconnect. The main processing unit 1412 may consist of one or more processor cores working together as a unit.

Computer system 1400 further comprises a random access memory (RAM) or other dynamic storage device 1404 (referred to as main memory) coupled to bus 1411 for storing information and instructions to be executed by main processing unit 1412. Main memory 1404 also may be used for storing temporary variables or other intermediate information during execution of instructions by main processing unit 1412.

Firmware 1403 may be a combination of software and hardware, such as Electronically Programmable Read-Only Memory (EPROM) that has the operations for the routine recorded on the EPROM. The firmware 1403 may embed foundation code, basic input/output system code (BIOS), or other similar code. The firmware 1403 may make it possible for the computer system 1400 to boot itself.

Computer system 1400 also comprises a read-only memory (ROM) and/or other static storage device 1406 coupled to bus 1411 for storing static information and instructions for main processing unit 1412. The static storage device 406 may store OS level and application level software.

Computer system 1400 may further be coupled to or have an integral display device 1421, such as a cathode ray tube (CRT) or liquid crystal display (LCD), coupled to bus 1411 for displaying information to a computer user. A chipset may interface with the display device 1421.

An alphanumeric input device (keyboard) 1422, including alphanumeric and other keys, may also be coupled to bus 1411 for communicating information and command selections to main processing unit 1412. An additional user input device is cursor control device 1423, such as a mouse, trackball, trackpad, stylus, or cursor direction keys, coupled to bus 1411 for communicating direction information and command selections to main processing unit 1412, and for controlling cursor movement on a display device 421. A chipset may interface with the input/output devices.

Another device that may be coupled to bus 1411 is a power supply such as a battery and Alternating Current adapter circuit. Furthermore, a sound recording and playback device, such as a speaker and/or microphone (not shown) may optionally be coupled to bus 1411 for audio interfacing with computer system 1400. Another device that may be coupled to bus 1411 is a wireless communication module 1425. The wireless communication module 1425 may employ a Wireless Application Protocol to establish a wireless communication channel. The wireless communication module 1425 may implement a wireless networking standard such as Institute of Electrical and Electronics Engineers (IEEE) 802.11 standard, IEEE std. 802.11-1999, published by IEEE in 1999.

In one embodiment, the software used to facilitate the routine can be embedded onto a machine-readable medium. A machine-readable medium includes any mechanism that provides (i.e., stores and/or transmits) information in a form accessible by a machine (e.g., a computer, network device, personal digital assistant, manufacturing tool, any device with a set of one or more processors, etc.). For example, a machine-readable medium includes recordable/non-recordable media (e.g., read only memory (ROM) including firmware; random access memory (RAM); magnetic disk storage media; optical storage media; flash memory devices; etc.), as well as electrical, optical, acoustical or other form of propagated signals (e.g., carrier waves, infrared signals, digital signals, etc.); etc.

Through the practice of embodiments described herein, the overall power consumption involved in transmitting and receiving data between components over an internal bus may be reduced. More specifically, the overall power consumption involved in transmitting and receiving flits between CSI agents over a point-to-point interconnect may be reduced.

In embodiments described herein, system components benefiting from reduced power consumption enabled by the described embodiments are backward compatible with system components communicating with a common protocol.

In embodiments where lanes are physically removed from an interconnect connecting system components, pins and traces on the motherboard can be removed, reducing overall footprint, or freeing space for other circuitry. Communication between system components over interconnects configured according to embodiments described herein may achieve high bandwidth using reduced hardware and footprint (e.g. the same bandwidth realized by full width links).

Thus, a method and apparatus for reduced power consumption communication over a physical interconnect has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. An apparatus, comprising:
an input/output circuit having,
a port to receive a transmission unit via an internal bus from a transmitter within a device,
at least one combining module coupled to the port to append at least one of a first and a second indicator to the transmission unit,
a first adder module to generate the first indicator indicating that the transmission unit is a starting transmission unit of a set of related transmission units,
a second adder module to generate the second indicator indicating that the starting transmission unit of the set of related transmission units has already been received, and
logic to determine at least one of the start and end boundaries of the set of related transmission units.

2. The apparatus of claim 1, wherein the input/output circuit includes at least one transmission error checking module to perform an error check on a first instance of a transmission unit that includes at least one of the appended first and second indicators.

3. The apparatus of claim 2, wherein the combining module to append the first indicator to the first instance of the transmission unit, and to append the second indicator to a second instance of the transmission unit, the input/output circuit includes a first transmission error checking module to error check the first instance of the transmission unit including the first indicator, and a second transmission error check module to error check the second instance of the transmission unit including the second indicator, and the logic includes a boundary determination module coupled to the first and second transmission error checking modules to determine whether the starting transmission unit of the set of related transmission units has been received.

4. The apparatus of claim 3, wherein the boundary determination module uses output from the first and the second transmission error checking modules to determine whether a start boundary of the set of related transmission units has been received.

5. The apparatus of claim 4, wherein the boundary determination module to determine that the transmission unit is the starting transmission unit if the first transmission error checking module does not return an error on the first instance of the transmission unit and the second transmission error checking module returns an error on the second instance of the transmission unit, and to determine that the transmission unit follows the starting transmission unit if the second transmission error checking module does not return an error on the second instance of the transmission unit and the first transmission error checking module returns an error on the first instance of the transmission unit.

6. The apparatus of claim 5, wherein the boundary determination module causes the transmission unit to be re-sent if the first and second transmission error checking module return an error on the first and the second instances of the transmission or the first and second transmission error checking module do not return an error on the first and the second instances of the transmission unit.

7. The apparatus of claim 3, wherein the transmission unit is a flit, the set of related transmission units is a packet, the starting transmission unit is a packet header flit, and the first and second transmission error checking modules include a Cyclic Redundancy Check (CRC) module.

8. The apparatus of claim 1, wherein the logic includes a decoder module configured to assume that an initial transmission unit received is the starting transmission unit of the set of related transmission units and to decode the starting transmission unit to determine the number of transmission units belonging to the set of related transmission units, and a counting module to track the start and end boundaries of the set of related transmission units.

9. The apparatus of claim 8, wherein the combining module includes a multiplexer, at least one of the first and second indicator is appended to 8 bits of the transmission unit, and the transmission unit comprises an 80 bit flit.

10. A method, comprising:
removing power from a portion of an interconnect, wherein said removal prevents transmission of information over the portion of the interconnect;
transmitting a transmission unit over a remaining portion of the interconnect;
determining with a receiver the information that was not transmitted due to said removal of power to the portion of the interconnect;
appending the transmission unit received over the remaining portion with one or more indicators; and performing a transmission error check at the receiver based on the transmission unit received over the remaining portion of the interconnect and the appended one or more indicators.

11. The method of claim 10, wherein the transmission unit is transmitted over the remaining portion of the interconnect at the same rate as it would be transmitted over the entire interconnect.

12. The method of claim 10, further comprising: appending the transmission unit with a first set of data to indicate that a starting transmission unit has been received; decoding the starting transmission unit to determine the number of transmission units included in a set of related transmission units; and appending future transmission units with a second set of data to indicate that the starting transmission unit has not been received, until the determined number of transmission units in the set of related transmission units has been received.

13. The method of claim 10, further comprising: appending a first indicator to a first instance of the transmission unit to indicate that the transmission unit is the starting transmission unit of the set of related transmission units; appending a second indicator to the second instance of the transmission unit to indicate that the transmission unit not the starting transmission unit of the set of related transmission units; performing a transmission error check on an appended first instance of the transmission unit and an appended second instance of the transmission unit; determining that the transmission unit is the starting transmission unit of the set of related transmission units if a transmission error is not returned on the appended first instance of the transmission unit and an error is returned on the appended second instance of the transmission unit; determining that the transmission unit is not the starting transmission unit of the set of related transmission units if an error is not returned on the appended second instance of the transmission unit and an error is returned on the appended first instance of the transmission unit requesting the transmission unit to be resent if the transmission error check returns an error on the resulting first and the second instances of the transmission unit or the transmission error check does not return an error on the resulting first and the second instances of the transmission unit.

14. A processing system, comprising:
a volatile memory device to store instructions;
a processor to execute instructions from an operating system; the processor and the memory device each having,
an input/output circuit including a port to receive one or more transmission units from another component within the apparatus via an internal bus,
a combiner coupled to the port to append an indicator to a transmission unit, and
a boundary determination module to determine that the transmission unit is at least one of a starting transmission unit of a set of related transmission units and not the starting transmission unit of the set of related transmission units, based at least on part on the indication appended to the transmission unit.

15. The processing system of claim 14, wherein the boundary determination module includes a decoder module configured to assume that an initial transmission unit received is the starting transmission unit of the set of related transmission units, and to decode the starting transmission unit to determine the number of transmission units belonging to the set of related transmission units, and a counting module to track the start and end boundaries of the set of related transmission units.

16. The processing system of claim 14, further comprising: at least one transmission error checking module to perform an error check on the first transmission unit based on a size of the first transmission unit, the size including the appended indicator.

17. The processing system of claim 16, wherein the boundary determination module to determine that the transmission unit is the starting transmission unit if a first transmission error checking module does not return an error on a first instance of the transmission unit and a second transmission error checking module returns an error on a second instance of the transmission unit, and to determine that the transmission unit follows the starting transmission unit if the second transmission error checking module does not return an error on the second instance of the transmission unit and the first transmission error checking module returns an error on the first instance of the transmission unit.

18. The processing system of claim 17, wherein the boundary determination module causes the transmission unit to be resent if the first and the second transmission error checking modules return an error on the first and the second instances of the transmission or the first and second transmission error checking modules do not return an error on the first and the second instances of the transmission unit.

19. The processing system of claim 14, wherein the volatile memory and the processor are contained within a mobile device.

* * * * *